A. CORDEAU.
DITCHING PLOW.
APPLICATION FILED FEB. 24, 1916.
1,221,972.
Patented Apr. 10, 1917.
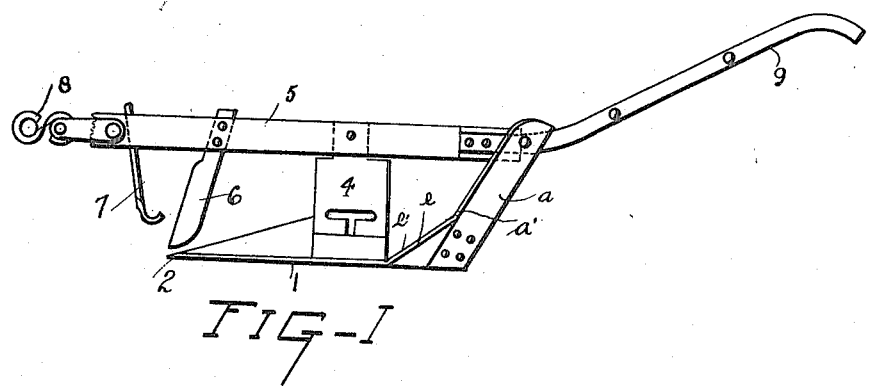
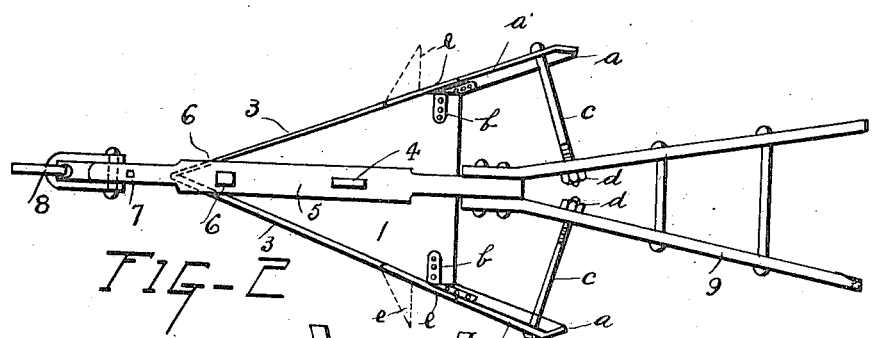
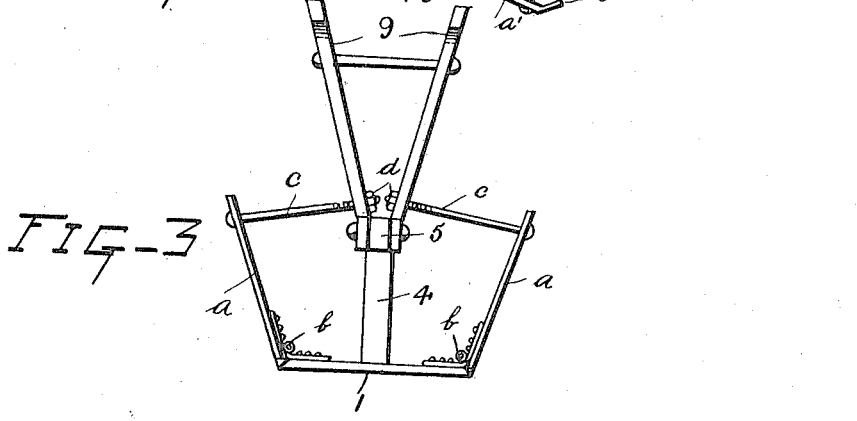
ADOLPHE CORDEAU
Inventor
By
Attorneys

UNITED STATES PATENT OFFICE.

ADOLPHE CORDEAU, OF STE. MADELEINE, QUEBEC, CANADA, ASSIGNOR OF ONE-HALF TO JOSEPH MIZAEL AUTHIER, OF ST. HILAIRE, QUEBEC, CANADA.

DITCHING-PLOW.

1,221,972.
Specification of Letters Patent.
Patented Apr. 10, 1917.

Application filed February 24, 1916. Serial No. 80,159.

*To all whom it may concern:*

Be it known that I, ADOLPHE CORDEAU, a subject of the King of Great Britain, residing at Ste. Madeleine, Province of Quebec, Canada, have invented certain new and useful Improvements in Ditching-Plows; and I do hereby declare that the following is a full, clear, and exact description of the invention, such as will enable others skilled in the art to which it appertains to make and use the same.

My invention relates to ditching plows.

The object of my invention is to provide a plow which will readily cut the side walls of a ditch and which may be adjusted to vary the inclination of the side walls.

My invention consists in the construction, combination and arrangement of parts as herein illustrated, described and claimed.

In the accompanying drawings forming part of this application, I have illustrated a form of embodiment of my invention in which drawings similar reference characters designate corresponding parts and in which:

Figure 1 is a side elevation of the plow embodying the invention;

Fig. 2 is a plan view of the same; and,

Fig. 3 is a rear end elevation.

Referring to the drawings 1 designates a flat share having the cutting point 2 and beveled side edges 3 adapted to cut the floor of the ditch.

A standard 4 is removably secured on the median line of the share, and a beam 5 disposed thereon. The beam carries a colter 6, gage runner 7 and a clevis 8. The usual handles 9 are secured to the rear end of the beam all of any common construction such as shown in my United States Patent Number 1,128,855.

The specific purpose of my invention is to provide an improvement over the construction therein described to the end of forming the share 1 with supplementary cutting members comprising integral lugs $e$ which are provided with cutting edges $e'$ and are upturned at an angle to the plane of the share 1. In manufacture these lugs are preferably formed integrally with the share as shown in dotted lines and are afterward turned upward.

To the rear of the lugs $e$ on opposite edges at the rear side of the share 1 the cutting members $a$, provided with beveled front cutting edges $a'$, have their lower ends secured to the share 1 by means of hinges $b$. The upper ends of the cutting members $a$ are secured to the outer ends of rods $c$ which are disposed through the handles 9 and adjustably held in position by means of nuts $d$.

By the construction described the primary cut for the side walls of the ditch is made by the lugs $e$ while the wall proper is cut by the cutting members $a$. The inclination of the wall may be varied by adjusting the rods $c$ through the handles 9, and the rods $c$ may be firmly fixed in any desired position by means of the nuts $d$.

Having thus fully described my invention, what I claim as new and desire to secure by Letters Patent is:

1. In combination with a plow, a plurality of cutting members secured to the sides of the share of the plow adjacent its rear end and supplementary cutting members on the edges of the share in advance of the said cutting members.

2. In combination with a plow the share of which is formed with a plurality of upturned lugs having forward cutting edges, a plurality of wall cutting members hinged to the share to the rear of the lugs, and means for adjustably retaining the cutting members.

3. The combination with a plowshare, of cutting lugs formed integral therewith and adapted to extend substantially at right angles thereto, said lugs having forward cutting edges, cutting members arranged at the rear of said lugs and connected to said share, and said cutting members extending upwardly beyond said lugs for the purpose set forth.

In witness whereof I have hereunto set my hand.

ADOLPHE CORDEAU.

Copies of this patent may be obtained for five cents each, by addressing the "Commissioner of Patents, Washington, D. C."